US 6,678,154 B2

(12) United States Patent
DeLuga (10) Patent No.: US 6,678,154 B2
(45) Date of Patent: Jan. 13, 2004

(54) LATCH ASSEMBLY THAT FACILITATES THE INSERTION AND REMOVAL OF A BATTERY MODULE FROM AN ELECTRONIC DEVICE

(75) Inventor: Ronald E. DeLuga, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3 days.

(21) Appl. No.: 09/929,298

(22) Filed: Aug. 14, 2001

(65) Prior Publication Data
US 2003/0035265 A1 Feb. 20, 2003

(51) Int. Cl.[7] .................................................. G06F 1/16
(52) U.S. Cl. ........................ 361/683; 361/724; 361/727
(58) Field of Search ................................. 361/724–733; 292/1–20, 32–43, 80–87, 121–129, 137–169, 256, 256.5, 256.63, 295, 342, 352

(56) References Cited

U.S. PATENT DOCUMENTS 5,764,477 A * 6/1998 Ohgami et al. ............. 361/683

* cited by examiner

Primary Examiner—Darren Schuberg
Assistant Examiner—Yean Hsi Chang (57) ABSTRACT

A technique that facilitates the removal of a battery module from a variety of electronic devices, such as portable computers. The technique utilizes a latch having a lifting mechanism that forces the battery module to a lifted position. Upon reaching the lifted position, retention features on the lift mechanism and the battery module engage to hold the battery module in the lifted position. At this lifted position, the battery module is readily gripped and removed.

17 Claims, 7 Drawing Sheets

LATCH ASSEMBLY THAT FACILITATES THE INSERTION AND REMOVAL OF A BATTERY MODULE FROM AN ELECTRONIC DEVICE

FIELD OF THE INVENTION

The present invention relates generally to electronic devices, such as portable computers, that utilize a battery module, and particularly to a latch mechanism that facilitates removal of the battery module.

BACKGROUND OF THE INVENTION

A variety of electronic devices, such as portable computers, include a battery module that may be used to power the device, at least when an electrical outlet is not available. The battery module often is mounted in an appropriately sized recess formed in an outer housing of the device. A retention mechanism is used to hold the battery module in place until desired removal for servicing, charging, replacement or substitution with a fully charged battery module.

In many applications, the battery module is disposed in the recessed area such that its outer surface is flush with an outer surface, e.g. bottom surface, of the device. A latch is used to permit release of the battery for removal. However, even when the latch is moved to an open or release position, the battery can be hard to grasp for removal. In some designs, the battery is forced or allowed to move outwardly upon movement of the latch to the open position, but the battery returns to its recessed position upon release of the latch. Accordingly, removal of the battery becomes a "two-hand" operation in which one hand actuates and holds the latch mechanism while the other hand is used to grip and remove the battery. It would be advantageous to simplify this procedure.

SUMMARY OF THE INVENTION

The present invention features a technique that facilitates removal of a battery module from an electronic device, such as a portable computer. The technique utilizes an electronic device having a housing with a battery module receptacle. A battery module is sized for receipt in the receptacle and held in place by a latch. The latch comprises a lifting mechanism that is positioned to engage and lift the battery upon actuation. The lifting mechanism utilizes a retention feature to retain the battery in a lifted position even upon release of the latch.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
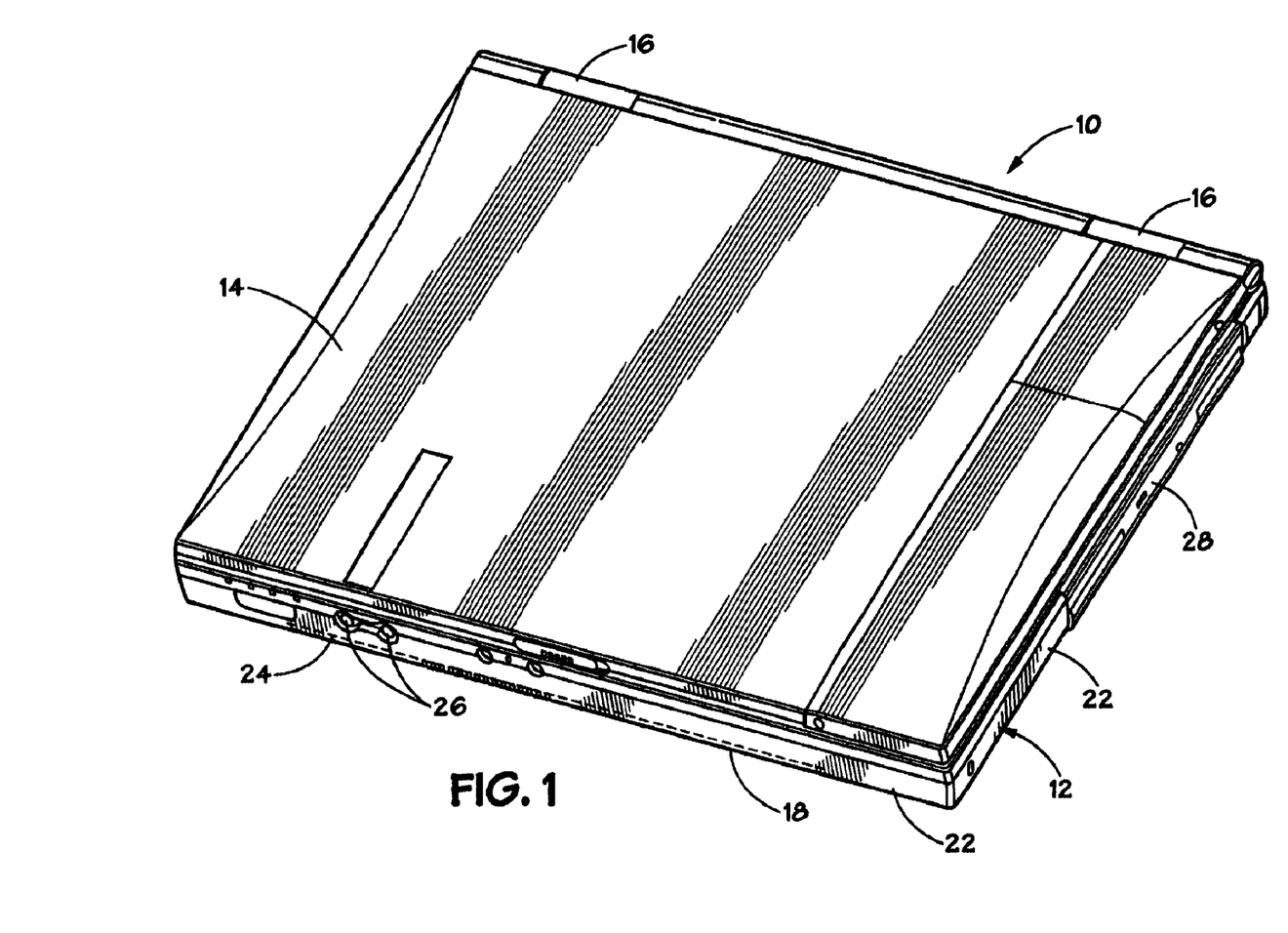
FIG. 1 is a front perspective view of an exemplary portable computer, according to one embodiment of the present invention.

Referring generally to FIG. 1, an exemplary electronic device 10 is illustrated. In this embodiment, electronic device 10 is a portable computer and in particular a laptop or notebook computer. Such portable computing devices are examples of devices that incorporate and benefit from features of the present invention. However, the illustrated device is used an example only and should not be construed as limiting the scope of the invention to these specific electronic devices. Hereinafter, electronic device 10 is referred to as portable computer 10 to facilitate explanation of the present invention.

Portable computer 10 comprises a base housing 12 coupled to a display 14. Display 14 may be moved between a closed position, as illustrated best in FIG. 1, and an open position, as illustrated best in FIG. 2. In the example illustrated, display 14 is coupled to base housing 12 by a hinge 16 that permits display 14 to be pivoted between the open and closed positions.

Base housing 12 typically has a bottom wall 18, a top deck 20 and a plurality of side walls 22 that generally extend between bottom wall 18 and top deck 20. Base housing 12 encloses a motherboard 24 disposed between bottom wall 18 and top deck 20. As is known to those of ordinary skill in the art, a variety of components, including one or more microprocessors, memory modules, drivers, etc. may be coupled to motherboard 24. Additionally, base housing 12 may be designed to provide openings for a variety of ports 26 and drives 28. The actual type and number of ports, drives and other features will vary with the design objectives of a given device.

Figure 2:
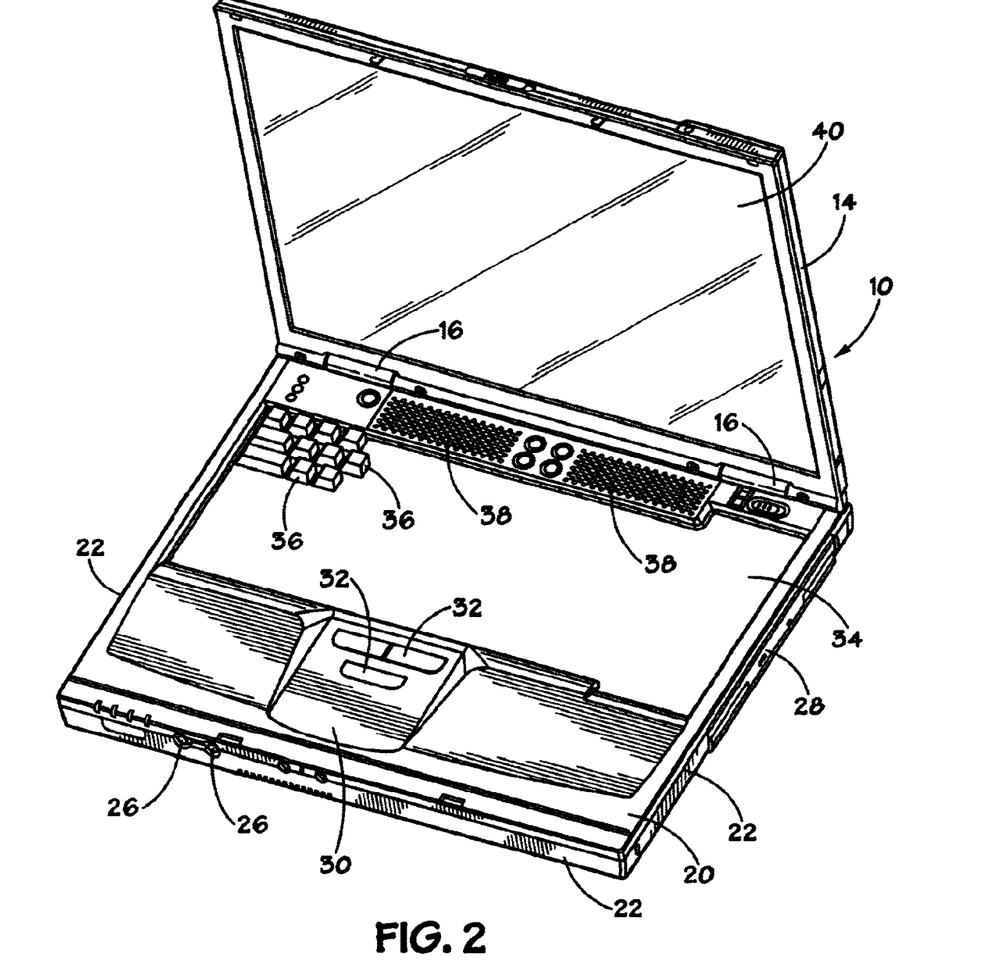
FIG. 2 is a view similar to FIG. 1 but showing a raised display screen.

As illustrated best in FIG. 2, portable computer 10 also includes one or more user interfaces, such as a mouse pad 30 having a plurality of control buttons 32. Another exemplary interface may include a keyboard 34 having a plurality of input keys 36. Portable computer 10 also may include a variety of other features, such as speakers 38 to provide audio output.

Display 14 may comprise a variety of displays designed to provide graphical information to a user. An exemplary display 14 is a flat screen display having a screen 40 on which graphical information is viewed.

Figure 3:
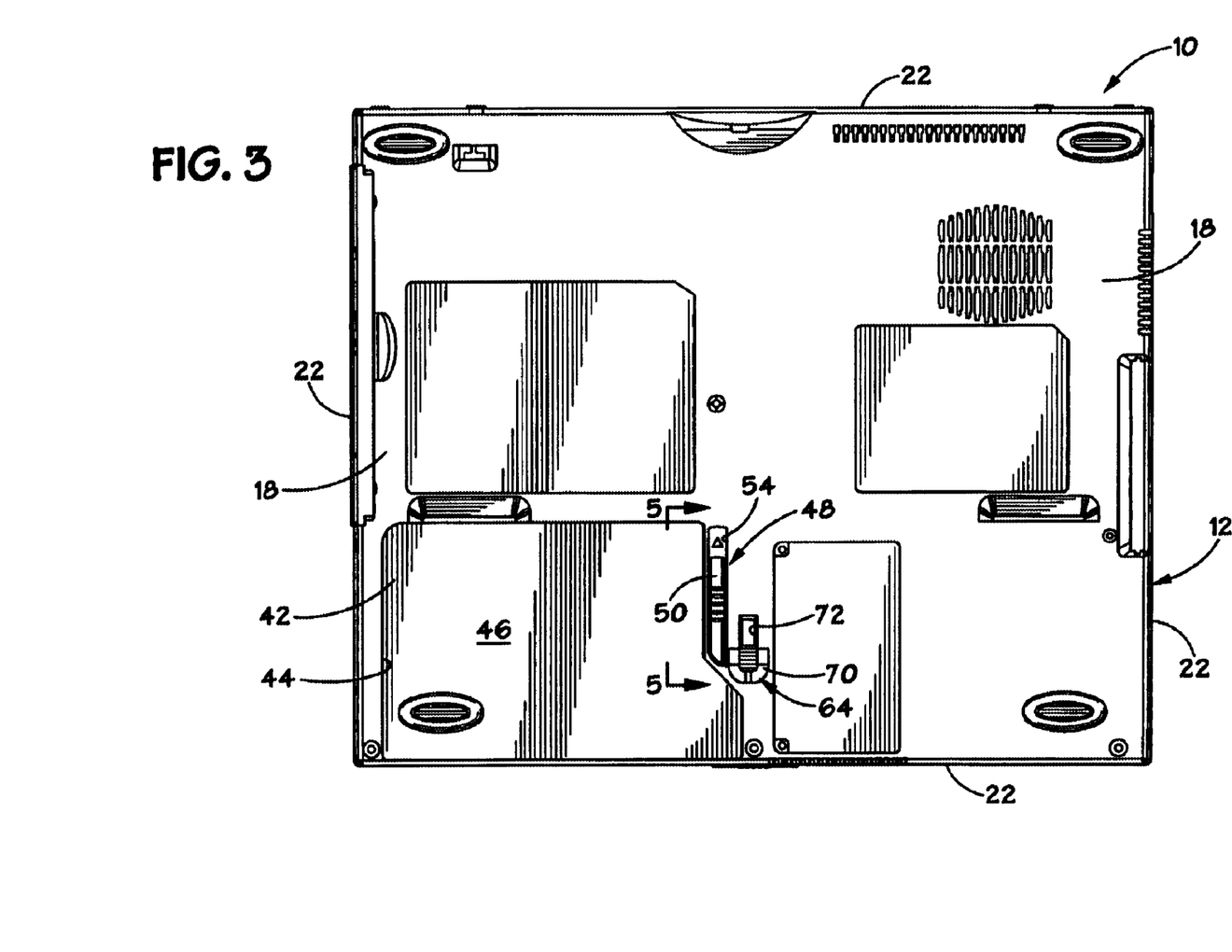
FIG. 3 is a bottom view of the device illustrated in FIG. 1.
Figure 4:
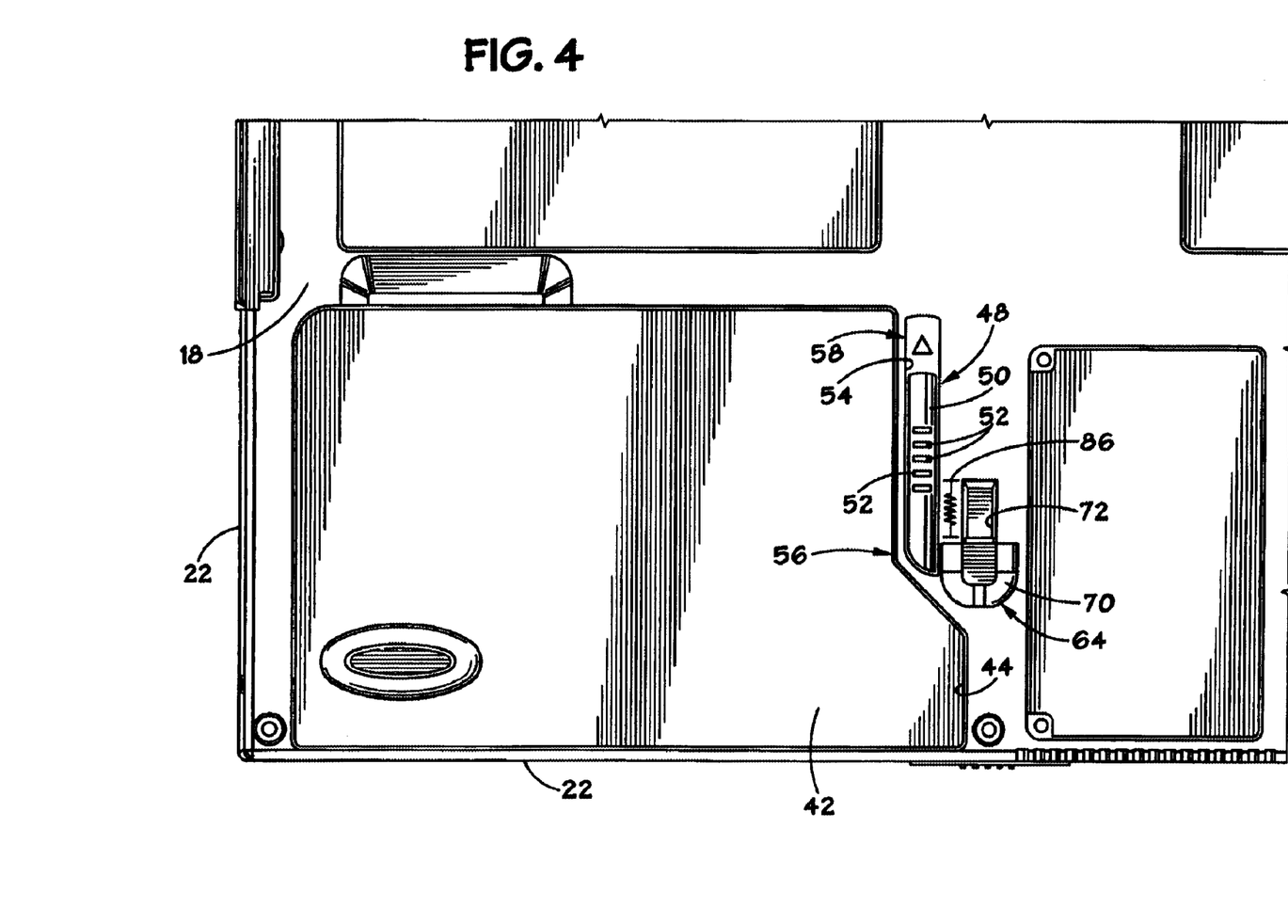
FIG. 4 is an enlarged view of the battery module and latch illustrated in FIG. 3.

Referring generally to FIGS. 3 and 4, power may be provided to portable computer 10 by a battery module 42. In the embodiment illustrated, battery module 42 is received in an appropriately sized receptacle 44 formed in bottom wall 18. Battery module 42 has an exposed surface 46 that lies generally flush with the lower surface of bottom wall 18. In this embodiment, exposed surface 46 is generally the lower or bottom surface of battery module 42.

Battery module 42 is held in place by a latch mechanism 48, as best illustrated in FIG. 4. Latch mechanism 48 comprises a slide member 50 having a series of raised grips 52. Slide member 50 may be engaged by a thumb or finger for sliding movement along a track 54. Slide member 50 is moved between a closed position 56 (see FIG. 4) and an open position 58 that permits removal of battery module 42. Latch mechanism 48 may incorporate a variety of holding mechanisms to maintain battery module 42 securely within receptacle 44 when slide member 50 is in closed position 56. For example, a variety of portable computers available from Compaq Computer Corporation utilize a latch mechanism designed to securely hold a battery module within its recessed receptacle of the portable computer housing.

Figures 5, 6:
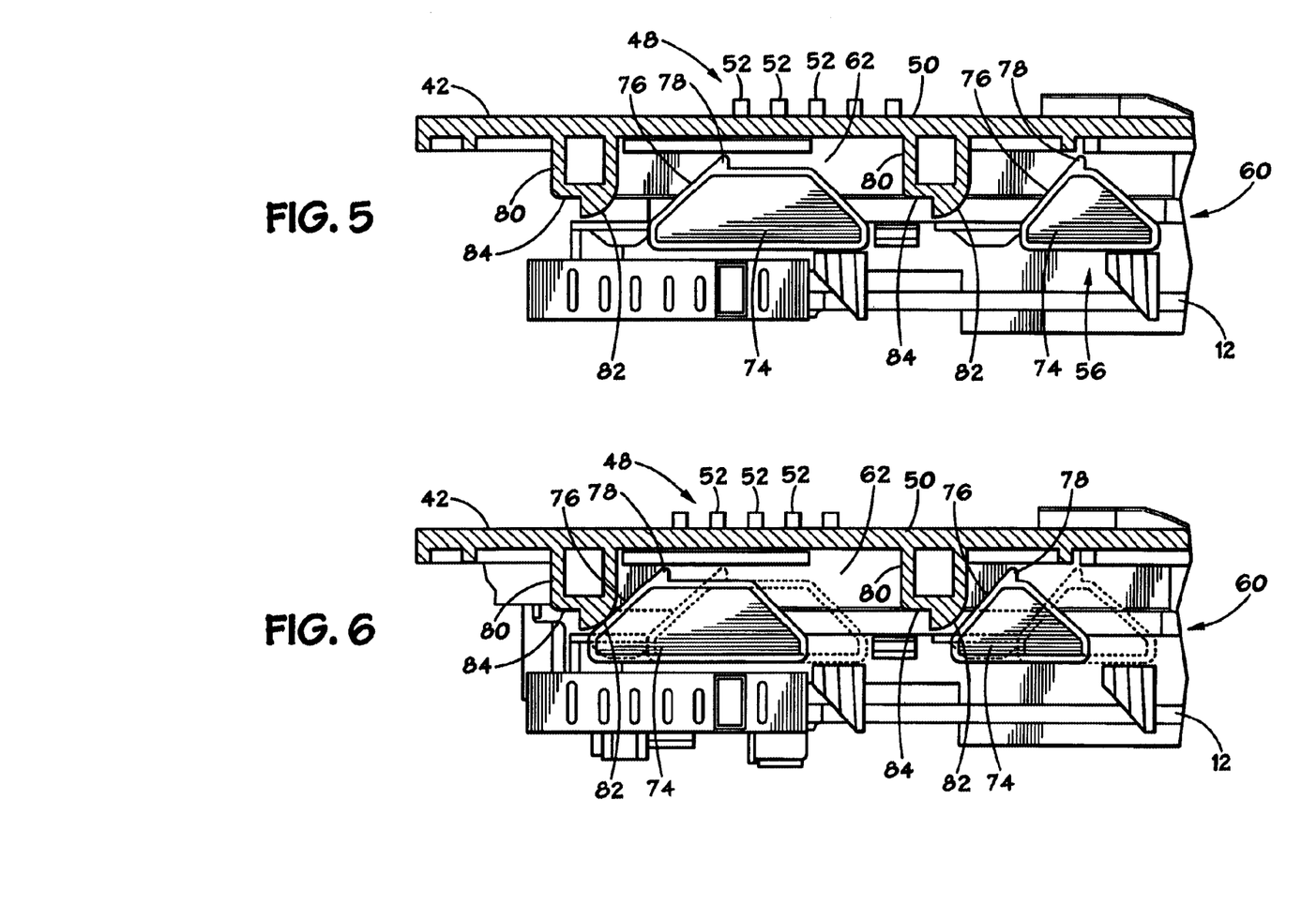
FIG. 5 is a cross-sectional view taken generally along line 5—5 of FIG. 3 and showing the lift mechanism associated with the latch illustrated in FIG. 4 in which the lift mechanism is in a closed position.
FIG. 6 is a view similar to FIG. 5 but showing the lift mechanism engaging the battery module.
Figure 7:
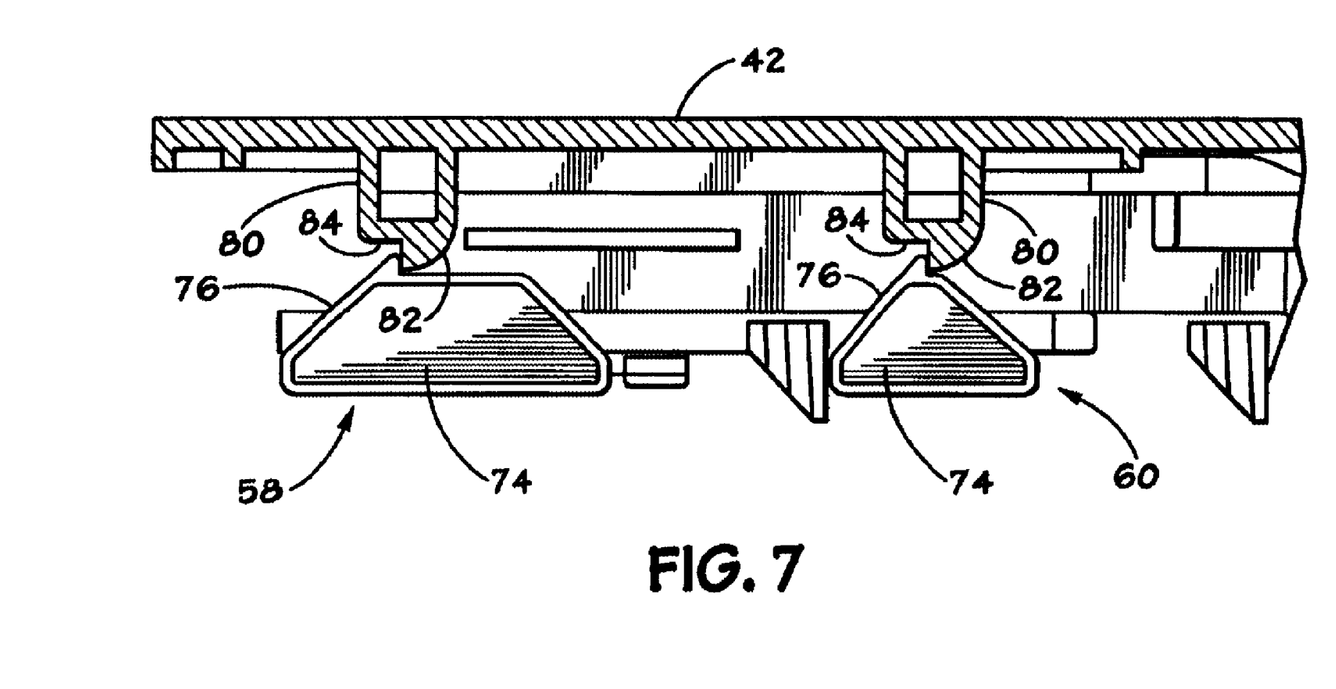
FIG. 7 is a view similar to FIG. 5 but showing the lift mechanism holding the battery module in a lifted position.

In the present case, however, latch mechanism 48 incorporates a lifting mechanism 60, as illustrated in FIGS. 5, 6 and 7. Lifting mechanism 60 is designed to engage and lift battery module 42 to a lifted position, as illustrated best in FIG. 7. Lifting mechanism 60 also is designed for retaining battery module 42 in this lifted position to permit easy removal by a user. In fact, the operation only requires one hand, because the user can move slide member 50 to open position 58 which raises and holds battery module 42 in the lifted position. The user may then grip and remove the battery module with the same hand used to operate slide member 50.

Latch mechanism 48 comprises a carriage 62 that is slidably mounted in base housing 12. Carriage 62 is coupled to slide member 50 such that movement of slide member 50 causes movement of carriage 62. At least one lift tab 74 and preferably a pair of lift tabs 74 are connected to carriage 62, as best illustrated in FIG. 5. Lift tabs 74 are positioned to engage and move battery module 42 to its lifted position. In the embodiment illustrated, each lift tab has a leading, sloped surface 76 positioned to engage battery module 42 as slide member 50 is moved towards open position 58, as illustrated best in FIG. 6.

Each lift tab 74 further comprises a retention feature 78, such as an outwardly extending tab, designed to hold battery module 42 in a lifted position even after release of slide member 50, as illustrated best in FIG. 7. Specifically, movement of slide member 50 from closed position 56 to open position 58 forces the sloped surface 76 of each lift tab 74 against an appropriate portion of battery module 42, thereby moving battery module 42 outwardly to its fully lifted position. At this lifted position, retention feature 78 engages the battery module 42 to maintain the battery module in such position.

In the specific embodiment illustrated, battery module 42 comprises one or more corresponding bosses 80 each positioned for engagement by a corresponding sloped surface 76 of lift tab or tabs 74. Each boss 80 comprises a generally curved engagement surface 82 designed to slide along a corresponding slope surface 76. Each boss 80 further comprises a retention notch 84 designed and positioned to engage retention feature 78. Thus, as slide member 50 is moved to open position 58, sloped surfaces 76 slide against engagement surfaces 82 forcing battery module 42 to its lifted position. Upon reaching the lifted position, each retention notch 84 slides past its corresponding retention feature 78, and the battery module 42 is held in the lifted position, as best illustrated in FIG. 7.

When battery module 42 is lifted from receptacle 44, each retention notch 84 is disengaged from its corresponding retention feature 78 and slide member 50 is allowed to return to its closed position 56. A biasing member may be used to bias slide member 50 back towards its closed position to facilitate automatic closure of latch mechanism 48. For example, a spring 86 may be utilized to automatically force slide member 50 to closed position 56, as illustrated in FIGS. 8 and 9.

Figure 8:
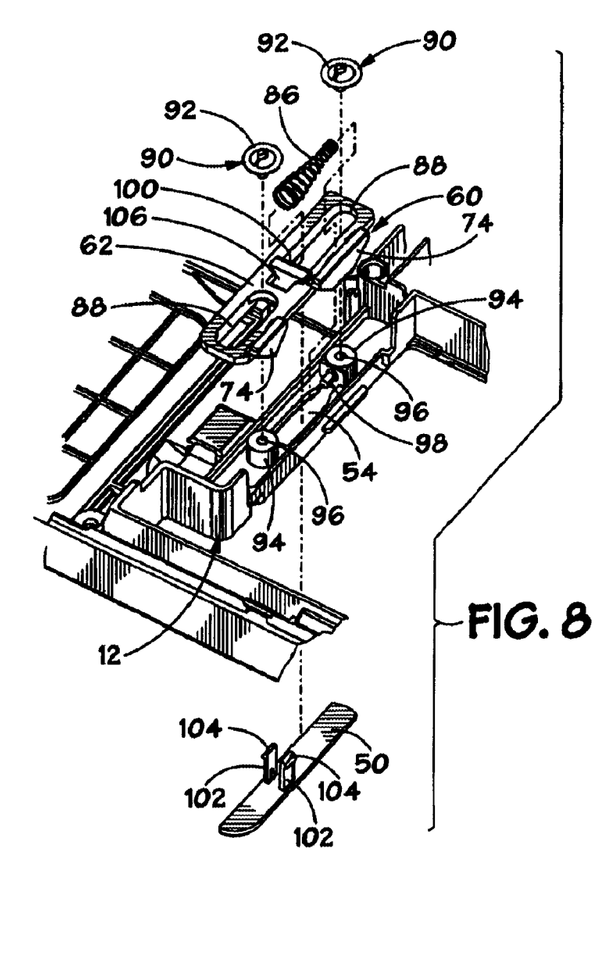
FIG. 8 is an exploded view of the latch.
Figure 9:
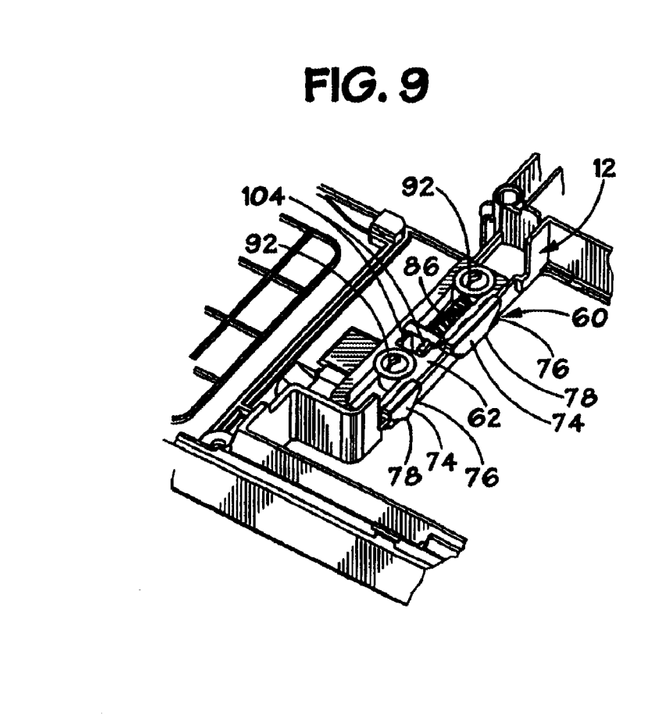
FIG. 9 is a view similar to FIG. 8 but showing the components in assembled form.

Although the carriage design may be adapted to a variety of specific applications, one exemplary design is illustrated in FIGS. 8 and 9. Specifically, carriage assembly 62 includes a pair of slide openings 88. A pair of fasteners 90 extend through slide openings 88 and capture carriage assembly 62 between expanded head portions 92 and mounting bosses 94 located on housing 12 (see FIG. 8). Mounting bosses 94 are disposed generally on opposite ends of track 54 and include appropriate openings 96, such as threaded openings, for threadably receiving fasteners 90.

Spring 86 is captured between a retention feature 98 disposed on housing 12 and a retention feature 100 disposed on carriage assembly 62. Thus, spring 86 acts between carriage assembly 62 and housing 12 to bias the carriage assembly and slide member 50 to the closed position.

Slide member 50 is coupled to carriage assembly through track 54. For example, slide member 50 may comprise a pair of flexible fingers 102 each having a retention end 104 (see FIG. 8) that may be inserted through track 54 and through a corresponding opening 106 formed in carriage assembly 62. When retention ends 104 of fingers 102 are inserted through opening 106, the retention ends are able to grip carriage assembly 62 (see FIG. 9) such that sliding movement of slide member 50 causes corresponding sliding movement of carriage assembly 62.

It will be understood that the foregoing description is of preferred embodiments of this invention, and that the invention is not limited to the specific forms shown. For example, the battery lifting mechanism may be incorporated into a variety of electronic devices; the design of the lift tabs and carriage assembly may be adjusted from one device to another; the configuration of the battery module may change; a variety of known latch mechanisms may be utilized to hold the battery module in its corresponding receptacle; the latch mechanism may be utilized with batteries that are inserted and removed through a side region of a device as opposed to a bottom or top region; and the lifting mechanism may incorporate one or more features that provide the lifting force. These and other modifications may be made in the design and arrangement of the elements without departing from the scope of the invention as expressed in the appended claims.

What is claimed is:

1. A computer device, comprising:
   a computer housing having a battery module receptacle;
   a battery module sized to be received in the battery module receptacle; and
   a latch having a lifting mechanism positioned to engage and lift the battery module upon actuation of the latch, wherein the lifting mechanism comprises a retention feature to retain the battery module in a lifted position until removal, wherein the battery module comprises a pair of bosses positioned for engagement by the lifting mechanism.

2. The computer device as recited in claim 1, wherein the latch comprises a spring to bias the lifting mechanism to a closed position.

3. The computer device as recited in claim 2, wherein at the latch is moved to an open position, the retention feature engages the battery and holds the latch in the open position until removal of the battery module.

4. The computer device as recited in claim 1, wherein the lifting mechanism comprises a pair of movable lift tabs oriented to engage the pair of bosses.

5. The computer device as recited in claim 1, wherein the computer housing comprises a portable computer housing.

6. The computer device as recited in claim 5, wherein the computer housing comprises a portable computer housing.

7. The computer device as recited in claim 1, wherein each boss comprises a notch positioned to engage the retention feature.

8. An electronic device, comprising:

a housing having a battery module receptacle;

a battery module sized to be received in the battery module receptacle; and a latch having a lifting mechanism positioned to engage and lift the battery module upon actuation of the latch, wherein the lifting mechanism comprises a retention feature to retain the battery module in a lifted position until removal, wherein the battery module comprises a pair of bosses positioned for engagement by the lifting mechanism.

9. The electronic device as recited in claim 8, wherein the latch comprises a spring to bias the lifting mechanism to a closed position.

10. The electronic device as recited in claim 9, wherein at the latch is moved to an open position, the retention feature engages the battery module and holds the latch in the open position until removal of the battery module.

11. The electronic device as recited in claim 8, wherein the lifting mechanism comprises a pair of movable lift tabs oriented to engage the pair of bosses.

12. The electronic device as recited in claim 1, wherein each boss comprises a notch positioned to engage the retention feature.

13. A method for removing a battery from a computer, comprising:

moving a lift mechanism having at least two lift tabs against at least two corresponding bosses of a battery module coupled to a computer housing;

lifting the battery module to a lifted position via the at least tow lift tabs; and maintaining the battery module at the lifted position.

14. The method as recited in claim 13, further comprising removing the battery module from the computer housing.

15. The method as recited in claim 13, wherein moving comprises sliding a latch exposed to a user through the computer housing.

16. The method as recited in claim 15, further comprising spring-loading the latch to bias the latch to a closed position.

17. The method as recited in claim 13, wherein maintaining comprises interlocking the at least two lift tabs with the battery module at the lifted position.

\* \* \* \* \*